United States Patent
Singliar et al.

(10) Patent No.: US 9,418,059 B1
(45) Date of Patent: Aug. 16, 2016

(54) METHODS AND SYSTEMS FOR PROCESSING NATURAL LANGUAGE FOR MACHINE LEARNING

(71) Applicant: The Boeing Company, Seal Beach, CA (US)

(72) Inventors: Tomas Singliar, Sammamish, WA (US); William R. Murray, Seattle, WA (US); Robert E. Cranfill, Seattle, WA (US); Dragos D. Margineantu, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 211 days.

(21) Appl. No.: 13/781,211

(22) Filed: Feb. 28, 2013

(51) Int. Cl.
*G06F 17/28* (2006.01)

(52) U.S. Cl.
CPC .................................. *G06F 17/28* (2013.01)

(58) Field of Classification Search
CPC ........................................................ G06F 17/28
USPC ............................................................... 704/9
See application file for complete search history.

(56) References Cited

U.S. PATENT DOCUMENTS

| | | | |
|---|---|---|---|
| 2003/0142851 A1* | 7/2003 | Brueckner et al. | 382/107 |
| 2009/0012922 A1* | 1/2009 | Tesauro et al. | 706/12 |
| 2010/0004542 A1* | 1/2010 | Dasgupta et al. | 600/453 |
| 2010/0198579 A1* | 8/2010 | Cunnington et al. | 704/3 |
| 2011/0035210 A1* | 2/2011 | Rosenfeld et al. | 704/9 |
| 2011/0184778 A1* | 7/2011 | Graepel et al. | 705/7.31 |
| 2012/0054302 A1* | 3/2012 | Priyadarshan et al. | 709/217 |
| 2013/0054816 A1* | 2/2013 | Gurbani et al. | 709/227 |
| 2013/0226453 A1* | 8/2013 | Trussel et al. | 701/533 |

OTHER PUBLICATIONS

McCune, Otter 3.3 Reference Manual, Argonne National Laboratory, dated Aug. 2003, pp. 72.
Clark et al., KM—The Knowledge Machine 2.0: Users Manual, retrieved Feb. 26, 2013, pp. 118.
Fuchs et al., Attempto Controlled English (ACE) Language Manual Version 3.0, ifi, dated Aug. 1999, pp. 81.
Clark et al., KM—The Knowledge Machine 1.4.0: KM's Situation Mechanism, retrieved Feb. 26, 2013, pp. 42.
Schwitter, Controlled Natural Languages for Knowledge Representation, Centre for Language Technology Macquarie University, retrieved Feb. 26, 2013, pp. 9.
Schwitter et al., Controlled Natural Language meets the Semantic Web, Centre for Language Technology Macquarie University, retrieved Feb. 26, 2013, pp. 8.
Clark et al., Naturalness vs. Predictability: A Key Debate in Controlled Languages, Boeing Research and Technology, retrieved Feb. 26, 2013, pp. 17.
Engelbrecht et al., Talking Rabbit: a User Evaluation of Sentence Production, Ordnance Survey, retrieved Feb. 26, 2013, pp. 5.

(Continued)

*Primary Examiner* — Qian Yang
(74) *Attorney, Agent, or Firm* — Armstrong Teasdale LLP

(57) ABSTRACT

Methods and systems are provided for processing natural language for machine learning analytical systems. The method includes receiving, at a processor, an input including text representing one or more observed parameters of an environment. The inputted text is in a natural language format. The processor parses the input and extracts the one or more parameters. A function is defined representing a domain of the one or more observed parameters based upon the one or more extracted parameters.

15 Claims, 6 Drawing Sheets

(56) References Cited

OTHER PUBLICATIONS

Lakoff, Women, Fire and Dangerous Things, What Categories Reveal about the Mind, The University of Chicago Press, retrieved Feb. 26, 2013, pp. 54.

Kovecses, Language, mind and culture: a practical introduction, Oxford University Press, dated 2006, pp. 7.

Koveceses, Universality and cultural variation in metaphor, Eotvos Lorand University Budapest, retrieved Feb. 26, 2013, pp. 6.

Supplementary Readings, Chapter 6 Language and Cognition, retrieved Feb. 26, 2013, pp. 30.

Singliar et al., Scaling up Inverse Reinforcement Learning through Instructed Feature Construction, Boeing Research and Technology, retrieved Feb. 26, 2013, pp. 3.

Ng et al., Algorithms for Inverse Reinforcement Learning, CS Division U.C. Berkeley, retrieved Feb. 26, 2013, pp. 8.

Clark et al., Acquiring and Using World Knowledge using a Restricted Subset of English, Mathematics and Computing Technology Boeing Phantom Works, retrieved Feb. 26, 2013, pp. 6.

U.S. Appl. No. 13/089,085, filed Apr. 18, 2011.

U.S. Appl. No. 13/405,698, filed Feb. 27, 2012.

* cited by examiner

S = [the place] place-concept is a kind-of-place
[with radius r] at coordinates (x,y).

METHODS AND SYSTEMS FOR PROCESSING NATURAL LANGUAGE FOR MACHINE LEARNING

BACKGROUND

The field of the disclosure relates generally to processing natural language for machine learning, and more specifically, to methods and systems for generating from surveillance observations input as natural language, a mathematical function representative of membership of the observations and applying the function to discover new concepts and anomalous patterns of behavior.

Analysis of surveillance data is one major bottleneck in situational awareness in security applications of public spaces and war theatres. For example, there may be significantly more hours of video data available for a given security application than man-hours to review it. One task of an intelligence analyst in analyzing the surveillance data is the estimation of what an observable agent (e.g., a person, or by extension, a vehicle) intends to do based upon its previously observed behavior recorded on video. Recognizing the intent of such agents from their observed behaviors is a key fundamental computational capability with numerous applications: in intelligence and surveillance (e.g., monitoring vehicle movements on a large scale from overhead assets), cyber-security (estimating the continuation of a cyber-attack sequence), or health care (e.g., assistive technologies recognizing the intended goal of an elderly or disabled person).

Computer technologies, such as machine learning systems, are one technological route to artificial systems for understanding and tracking the behavior of others. Typically, the more "prior knowledge" that can be made available to the machine-learning system, the better the results that can be obtained. However, additional data typically requires additional analysis time, and the prior knowledge data must be coded using complex computer languages in order to be used by the machine-learning system. In typical systems, prior knowledge is typically resident with "domain experts", i.e., people with experience performing the same task). Often, the domain experts (also called subject matter experts, or SMEs) are typically not mathematically sophisticated, do not have computer programming experience and do not have adequate time to program a machine-learning system with their prior-knowledge data in the midst of a mission-critical real-time task. Thus, it is desirable for the user to provide this domain-specific information in natural language.

Background knowledge expressed as natural language text that cannot be processed as given generates feedback to indicate how the text or sentences need simplification for machine understanding. Typically, the changes required are shortening of sentences, simplifications of syntax, and reduction in the number of clauses and prepositional phrases to be handled. Such simplified versions of natural language, similar to what a new speaker of a foreign language might comfortably handle, are called controlled natural languages.

Computer processing of natural language is very difficult, as compared to processing of traditional computer language. As mentioned, controlled natural language is a subset of natural language that maps to formal representations. Generally, controlled natural languages do not have provisions for processing time and space values other than distinguishing between times and locations in terms of an answer to a simple when or where question. At least one known controlled natural language relies on situation calculus for its formal semantics, and is implemented in a frame-like knowledge representation language, with a context mechanism, where each context is called a situation. Another known controlled natural language uses event calculus and relies on first-order logic theorem provers to implement its inference. In such controlled natural languages, the focus is on representing possible worlds that result from actions, and making inferences in those worlds that are definitely true or definitely false. Consequently, existing controlled natural languages do not address whether events are close to places or times of interest or the interrelationship of possibly overlapping regions in time and space that may have degrees of overlap. Rather, known controlled natural languages address temporal reasoning oriented towards planning and hypothetical reasoning. Spatial reasoning is not addressed as there is no translation from spatial concepts to a mathematic representation. Temporal reasoning is addressed only in the manner of providing hard logical constraints, either true or false, incapable of mathematically formalizing vaguely defined concepts, such as "near", "close to", "around", or "at" versus "in".

BRIEF DESCRIPTION

In one embodiment, a computer-implemented method is provided for processing natural language for machine learning analytical systems. The method includes receiving, at a processor, an input including text representing one or more observed parameters of an environment. The inputted text is in a natural language format. The processor parses the input and extracts the one or more parameters. A function is defined representing a domain of the one or more observed parameters based upon the one or more extracted parameters.

In another embodiment, one or more computer-readable storage media having non-transitory computer-executable instructions embodied thereon are provided. When executed by at least one processor, the computer-executable instructions cause the at least one processor to receive an input including text representing one or more observed parameters of an environment. The inputted text is in natural language format. The processor also parses the input and extracts the one or more parameters. The processor then defines a function representing a domain of the one or more observed parameters based upon the one or more extracted parameters.

In yet another embodiment, a computer-implemented method is provided for determining an anomalous behavior. The method includes utilizing output of a tracking system to track observations of agent behaviors. An input including text representing one or more observed parameters of an environment is then inputted to a computer processor. The inputted text is in natural language format. The processor is used to parse the input and extract the one or more parameters. A function is defined representing a domain of the one or more observed parameters based upon the one or more extracted parameters. Anomalous behavior is then determined based on observations of agents and the defined function.

DETAILED DESCRIPTION

Figure 1:
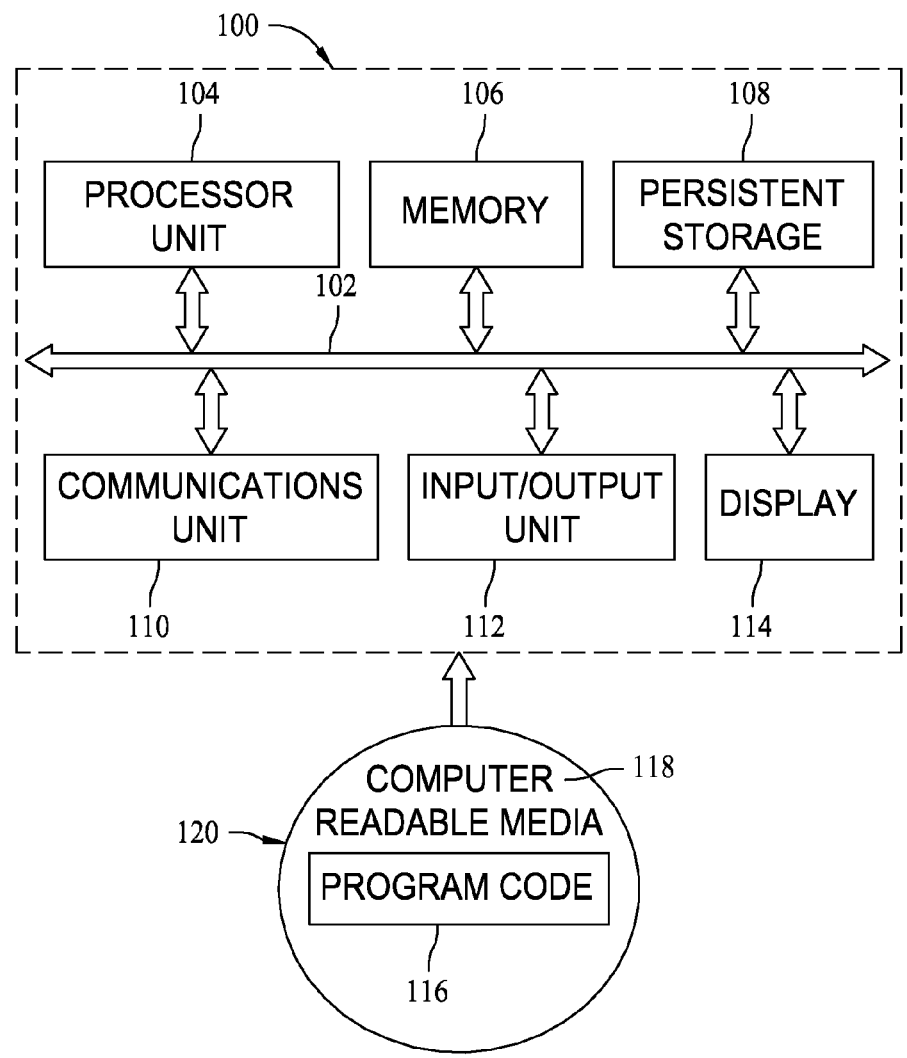
FIG. 1 is a schematic illustration of a data processing system.

FIG. 1 is a schematic diagram of an exemplary data processing system 100. In this implementation, data processing system 100 includes a communications fabric 102 that enables communication between a processor unit 104, a memory 106, a persistent storage 108, a communications unit 110, an input/output (I/O) unit 112, and a display 114. Data processing system 100 is operable for being programmed with and executing the algorithms described herein.

Processor unit 104 executes instructions of software, for example software stored in memory 106. Processor unit 104 may be a set of one or more processors or a multi-processor core. In another implementation, processor unit 104 may be implemented using one or more heterogeneous processor systems in which a main processor is present with secondary processors on a single chip. In yet other implementations, processor unit 104 may be a symmetric multi-processor system containing multiple processors of the same type. However, it should be understood that processor unit 104 may be any processing device capable of allowing the system to function as described herein.

Memory 106 and persistent storage 108 are may be any type of hardware capable of electronically storing information on a temporary basis and/or a permanent basis. For example, memory 106 may include without limitation, a random access memory (RAM), read only memory (ROM) or any other suitable volatile or non-volatile storage device. Persistent storage 108 may take various forms depending on the particular implementation. For example, in one implementation, persistent storage 108 includes one or more of a hard drive (HDD), a flash memory, a rewritable optical disk, a rewritable magnetic tape, or some combination of the above. The media used by persistent storage 108 may also be removable. For example, a removable hard drive may be used as persistent storage 108.

In the exemplary implementation, communications unit 110 facilitates communications with other data processing systems or devices. For example, in one implementation, communications unit 110 is a network interface card for interfacing with an outside network. In some implementations, communications unit 110 may provide communications through the use of wired and/or wireless communication links.

Input/output unit 112 allows for input and output of data, such as electronic data, with other devices that may be connected to data processing system 100. For example, input/output unit 112 may provide gather user input through a keyboard and mouse. Additionally, input/output unit 112 may send output to a printer or other output device. Display 114 provides a mechanism to provide information to a user, such as a monitor, speaker or the like.

Instructions for the operating system and applications or programs are located on persistent storage 108 and may be loaded into memory 106 for execution by processor unit 104. These instructions may be referred to as program code, computer usable program code, or computer readable program code that may be read and executed by processor unit 104. The program code in the different implementations may be embodied on one or more physical or tangible computer readable media, such as memory 106 or persistent storage 108. Any of the computer instructions or program code referenced herein may be stored in a non-transitory manner.

Program code 116 is stored in a functional format on computer readable media 118 such that it may be selectively removable and may be loaded onto, or transferred to, data processing system 100 for execution by processor unit 104. Program code 116 and computer readable media 118 form computer program product 120 in such implementations. In one implementation, computer readable media 118 is stored, for example, on an optical or magnetic disc that is inserted or placed into a drive or other device that is part of persistent storage 108 for transfer onto a storage device, such as a hard drive that is part of persistent storage 108. In a tangible form, computer readable media 118 may also take the form of a persistent storage, such as a hard drive, a thumb drive, or a flash memory that is connected to data processing system 100. The tangible form of computer readable media 118 is also referred to as computer recordable storage media. In some implementations, computer readable media 118 may not be removable.

Alternatively, program code 116 may be transferred to data processing system 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links, wireless transmissions or the like including the program code.

In other implementations, program code 116 may be downloaded over a network to persistent storage 108 from another device or data processing system for use within data processing system 100. For example, program code stored in a data processing system may be downloaded over a network from the server to data processing system 100. The data processing system providing program code 116 may be a server computer, a client computer, or some other device capable of storing and transmitting program code 116.

The different components illustrated for data processing system 100 are not intended to be restrictive of architectural limitations to the manner in which different implementations may be configured. The different illustrative implementations may be implemented in a data processing system including components in addition to or in place of those illustrated for data processing system 100.

In one implementation, a bus system may be used to implement communications fabric 102 and may include one or more buses, such as a system bus or an input/output bus. It should be understood that the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as that found in an interface and memory controller hub that may be present in communications fabric 102.

Figure 2:
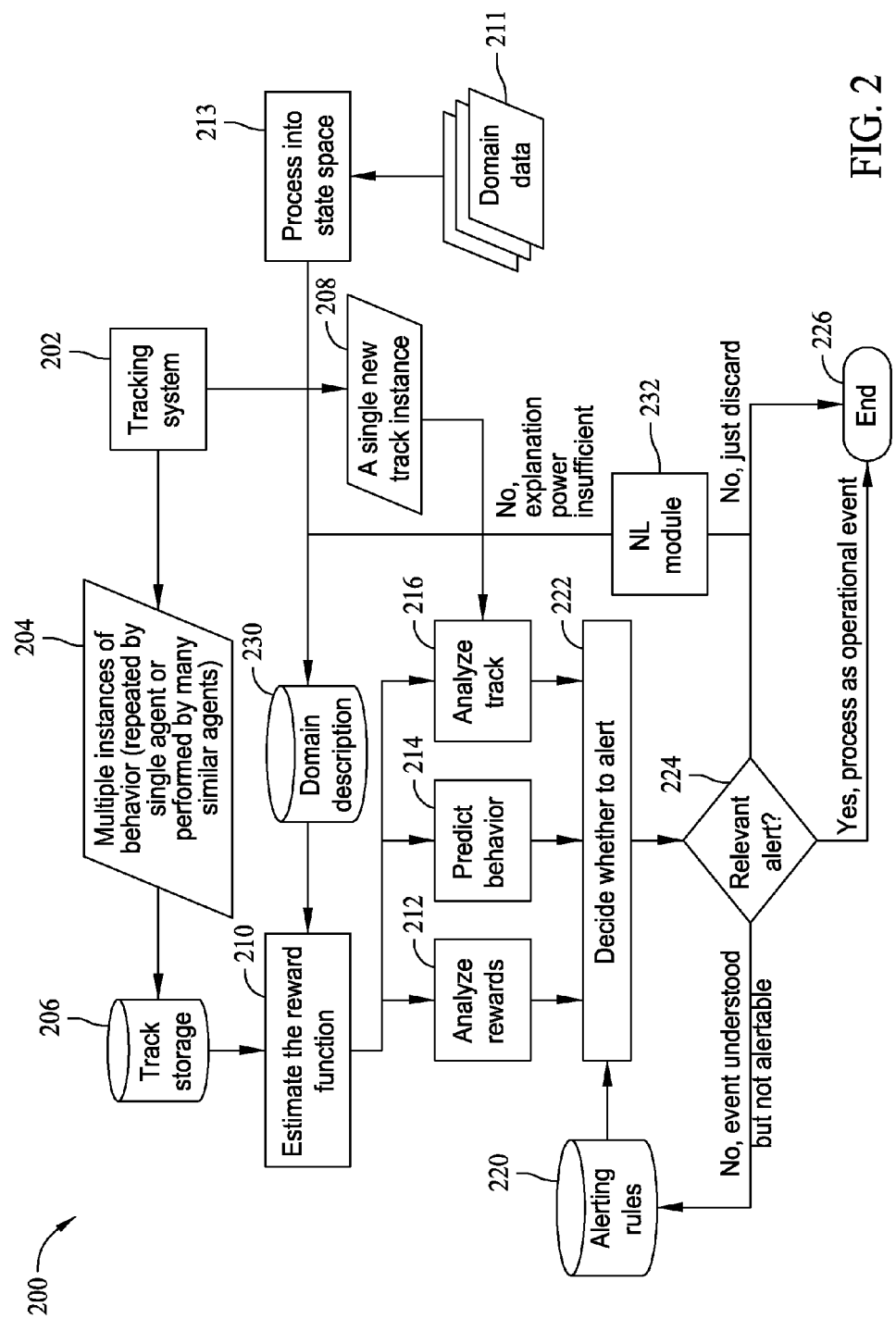
FIG. 2 is a flow diagram of various algorithms operable for execution by the data processing system shown in FIG. 1.

FIG. 2 is a flow diagram for a process 200 that illustrates methods for the various algorithms described herein. In the exemplary implementation, process 200 is implemented by processing unit 104 (shown in FIG. 1). A tracking system 202 is configured to provide agent observations of action/state sequences. As used herein, an "agent observation" refers to, for example, an object state (e.g., a set of key attributes at a point in time), or an action performed by an agent. Tracking system 202 is configured to track agent observations using one or more of satellites, radar systems, and/or any other tracking device capable of associating one or more parameters with an observation. For example, in one implementation, tracking system 202 associates a time and a position with an observation. In another implementation, tracking system 202 associates a parameter as being "near", "in", or "away" from a specified value, and defines a smooth fall-off on a variation of the parameter. For example, the parameter may be system response time. The tracking system produces sequences of actions and states identified as being performed by one agent. Observations, for example, multiple instances of behavior 204 including those repeated by a single agent or performed by multiple agents may be stored within a tracking storage area 206. Tracking storage area 206 may be memory 106, persistent storage 108, computer readable media 118 (all shown in FIG. 1), or other suitable storage. Tracking system 202 also is configured to recognize instances of new single tracks 208.

Based on the stored behavior 204, a resolving utility function is derived. For example, a reward function for the agent can be estimated 210. The agent's actions may be assumed to be rational from the agent's internal perspective but the implicit action and/or state costs (utilities) used by such agents in their decision-making are previously unknown to the observer. In various implementations, the resolving utility function may be characterized in terms of action and state costs instead of a reward. It is noted that the terms rewards, costs, and utilities may be used synonymously herein, as they refer to the same mathematical and computational object with at most a sign change. The estimation 210 is also based on basis functions or domain descriptions 230. One possible implementation of estimation 210 is an inverse reinforcement learning algorithm. Domain descriptions 230 are formed by processing domain data 211 (e.g., a road network) into state spaces 213. Based on the estimation 210, rewards for expected behavior can be analyzed 212, further behaviors predicted 214, and movement tracks analyzed 216. Instances of new single tracks 208 may also be analyzed 216.

Alerting rules 220, along with the analyzed rewards 212 for expected behavior, behaviors predicted 214, and tracks analyzed 216, are utilized in deciding 222 whether to issue an alert based on an agent observation. These alerting rules may also be expressed in a controlled natural language. Alternatively, they may be expressed in terms of thresholds or other mathematical functions. In the exemplary implementation, an alerting rule 220 defines when processor unit 104 generates an alert based on the occurrence of one or more alertable events. To determine if an alert is a relevant alert 224 (i.e., an alert with operational or actionable relevance), a system user, or analyst, judges whether processing unit 104 correctly modeled the domain behavior of the agent or event causing the track, (i.e., used the relevant basis functions in determining whether the track signifies deviance warranting the alert), and whether the alert has operational relevance.

If an event is understood by processing unit 104, but is non-alertable because the particular type of event is not of interest to the system user, alerting rules 220 are updated using a suitable user interface. For example, the system user may indicate, with the assistance of the user interface, that "the digging is interesting to me, but only digging on the side of the road, not in the fields like you are showing me". The actual language may be simplified, e.g., "Digging near roads is anomalous. Digging in fields is normal.", to be more acceptable to a controlled natural language system. Alerting rules 220 are updated such that digging is still an alertable event, but only when it is on the side of the road. When digging occurs in the fields specified by the system user, it is no longer an alertable event. The system will better model normal and anomalous behavior, leading to better alerts, as a result of the user's natural language advice.

Alternatively, the alert may simply be discarded and the processing for the alert ends 226 if the system user determines that the event type is alertable, but the particular event is not of interest to the system user. For example, the system user may indicate, with the assistance of the user interface, that "I'm not too worried about this speeding vehicle (implicitly, but keep showing them to me)". When the alert is discarded, process 200 ends and no further action is taken.

Still alternatively, if the alert is not relevant, due to an insufficient breadth of explanation considered by the system, the system user may provide additional domain descriptions 230 in terms of one or more new basis functions. Additionally, the system user may proactively provide additional domain descriptions 230 to update the process or reward estimation 210. The system user provides additional domain descriptions 230 by inputting natural language into a natural language (NL) module 232 via the user interface, as is described in more detail herein. If the alert is determined to be a relevant alert, the alert is processed as an operational event (e.g., the system user follows the procedure for having identified a surveillance/intervention target), achieving the business or intelligence goal of the system, and the processing for the alert ends 226.

Figure 3:
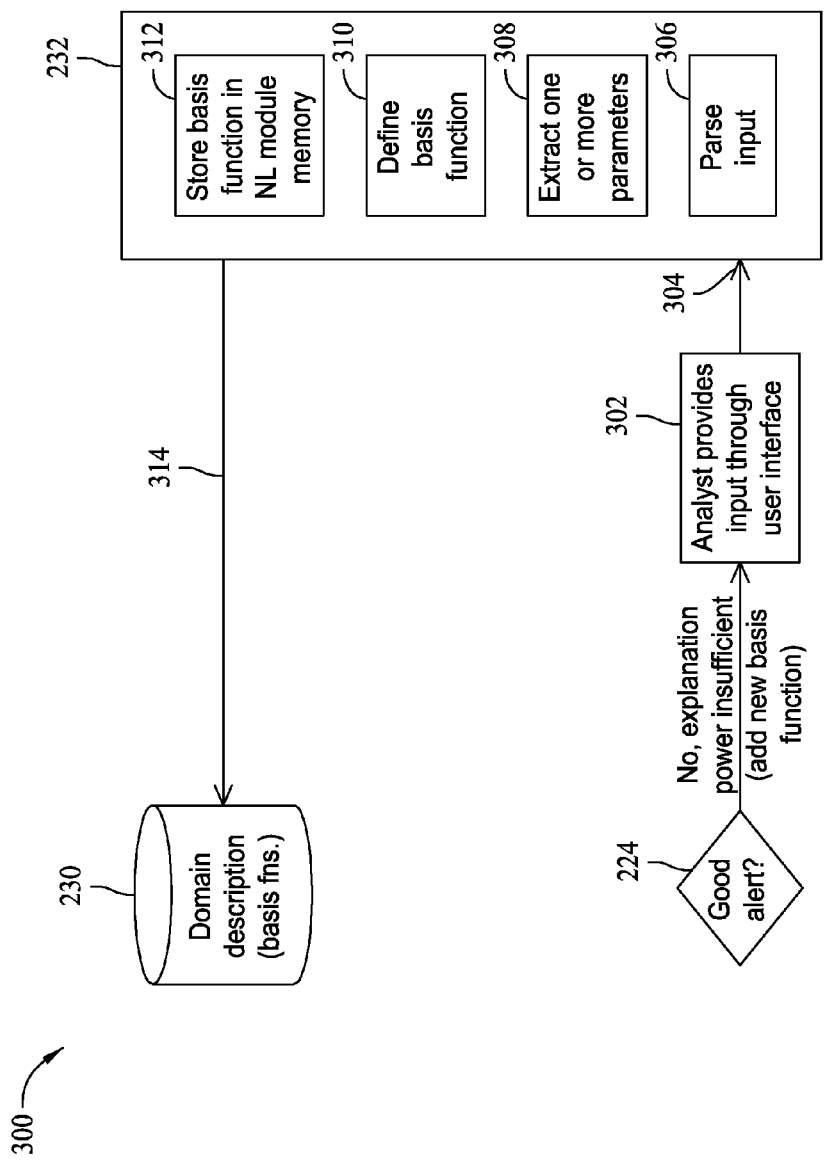
FIG. 3 is a flow diagram of a method of processing natural language using the natural language (NL) module illustrated in FIG. 2.

FIG. 3 is a flowchart 300 of a method of processing natural language using natural language (NL) module 232 shown in FIG. 2. In the exemplary implementation, NL module 232 is similar to data processing system 100 (shown in FIG. 1). In the exemplary implementation, NL module 232 is positioned at a remote location from tracking system 202. The user inputs observed behaviors into a user interface of tracking system 202, which then transmits the observation data to NL module 232 via a communications link such as the Internet. Being remote from any single tracking system 202 enables NL module 232 to receive natural language inputs and provide generated and/or updated basis functions in terms of domain descriptions 230 to update numerous different reward estimators 210. In an alternative implementation, NL module 232 may be stored on a central device associated with only a single tracking system 202.

In the exemplary implementation, when an alert is not "good" or relevant, an analyst provides additional domain descriptions 230, as described in FIG. 2. An analyst may provide additional domain descriptions either proactively, or retroactively when an alert is not good due to an insufficient breadth of available explaining factors (basis functions) considered by tracking system 202 (shown in FIG. 2).

By using input/output unit 112 (shown in FIG. 1), the analyst inputs 302 a natural language textual note representing an additional domain description. NL module 232 receives 304 the input using a processor, such as processor 104 (shown in FIG. 1). The input 302 includes the text representing one or more observed parameters of an environment or observation. The inputted textual note is in a natural language format that is compliant with one or more sentence templates, or sentence grammars, provided by NL module 232, as described in more detail herein. In the exemplary implementation, the observed parameters include at least one of a spatial concept and a temporal concept (e.g., location and time). More specifically, in the exemplary implementation, the observed parameters include a spatiotemporal relationship (i.e., a relationship between a spatial concept and a temporal concept). Spatial concepts are observable by tracking system 202 such that position coordinates may be referenced to any object being tracked by tracking system 202. Additionally, temporal concepts are observable by utilizing time stamps associated with imagery taken by satellites and/or radar systems. NL module 232 then parses 306 the textual note that was input and extracts 308 the one or more parameters. More specifically, extracting 308 the one or more parameters includes extracting at least one of a spatial concept and a temporal concept. For example, extracting 308 one or more parameters may include extracting a spatial concept or a temporal concept, or extracting a combination of spatial and temporal concepts. As a further example, extracting 308 one or more parameters may include extracting a spatiotemporal relationship. Extracting the one or more parameters may also involve making additional inferences in terms of natural language, temporal reasoning, and/or spatial reasoning. Further, NL module 232 extracts 308 language elements from the textual note that describe predicates that correspond to sensing capabilities of tracking system 202. Temporal concepts may be represented in terms of a time-period within a range (i.e., year, month, day, hour, minute, or second or the like). Spatial concepts may be represented by a distance from a central point of an object or area, a distance from a bounded region, or by specific GPS coordinates or any location that allows the system 100 to function as described herein.

Based on the extracted parameters, the NL module 232 defines 310 a basis function representing a prototypical example, or instance, characterizing a domain of the parameters. The basis function is a mathematical expression that enables reward estimator 210 to interpret the spatial and temporal concepts mathematically and apply the concepts to events observed in the domain. Mathematically, a basis function is a function of the observed agent's state, action, or both, which is akin to a fuzzy logic membership function in that it returns values in the interval (0,1). For example, a temporal basis function constructed from the expression "on Saturdays" takes on values close to unity for each state or action argument whose timestamp falls on a Saturday. A new basis function is constructed for each spatio-temporal expression. Some basis functions are defined with respect to a database of background knowledge. The natural language may be used to define background temporal or spatial definitions of vague temporal and/or spatial concepts. For example, a spatial basis function constructed for "near a farm" refers to a database of farms, which may be encoded in a structured manner in GIS layer files (.kml and similar), a relational database, in the memory of the NL module, or in other suitable manner. In various embodiments, a spatiotemporal function $f(s,t)$ may be defined for space and time which returns a value of approximately 1.0 when s describes spatial proximity to the spatial concept and t describes a temporal proximity to the temporal concept, and declines toward 0.0 as the space and time supplied deviate from the spatial and temporal concepts.

In one implementation (the reference implementation), one method by which the NL module 232 constructs a basis function is to overlay a bell curve on the plurality of predicates to generate a smoothed membership function. Alternatively, a Gaussian function may be overlayed on the plurality of predicates to generate a smoothed membership function. Another method involves defining a membership function by combining pre-existing or primitive basis functions. Once defined, the basis function is stored 312 locally on memory 106 of NL module 232. NL module 232 also transmits 314 the basis function back to be stored as part of domain descriptions 230 and applied to estimate reward functions 210 (shown in FIG. 2).

In an alternate implementation, NL module 232 receives a plurality of text inputs in natural language format. NL module 232 extracts one or more parameters from each of the plurality of inputs. Thereafter, NL module 232 defines or redefines the basis function based upon the extracted parameters of the plurality of inputs.

Figure 4:
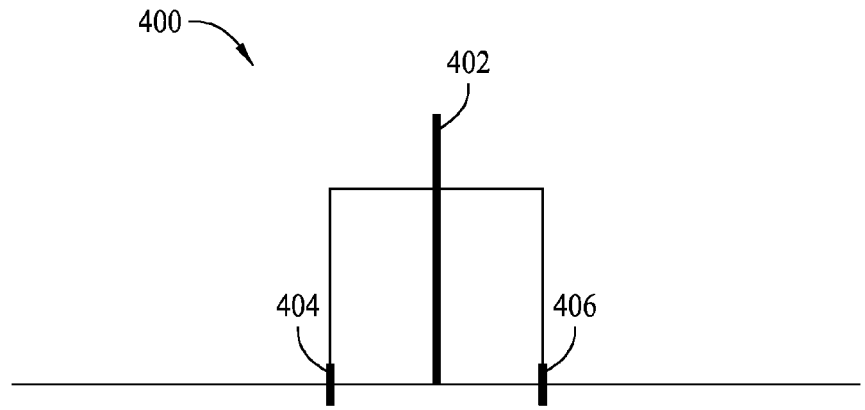
FIG. 4 is a plot illustrating a binary predicate created according to a first temporal sentence template during generation of a basis function based on a temporal concept by the NL module illustrated in FIG. 2.

FIG. 4 is a plot 400 illustrating a binary predicate defined according to a first temporal sentence template during generation of a basis function based on a temporal concept defined by the NL module shown in FIG. 2.

As previously described, tracking system 202 (shown in FIG. 2) is capable of observing events situated in both space and time. The tracking system ascribes position coordinates to any object being tracked by tracking system 202. Additionally, it associated time associated with imagery taken by satellites and/or radar systems. In the exemplary implementation, the natural language inputted by the system user needs to be in a format such that NL module 232 can interpret it and generate a new basis function. Such a format is accomplished by using at least one of a temporal sentence template or the controlled natural language grammar to define the new temporal concept. Similarly, a spatial sentence template or the controlled natural language grammar may be used to define a new spatial concept. In the event the input from the user cannot be parsed, NL module 232 provides feedback as to how the input needs simplification. For example, NL module 232 may require shortening of sentences, simplification of syntax, and/or reduction in the number of clauses or prepositional phrases to be handled.

In the exemplary implementation, NL module is configured to parse the natural language input and derive a basis function based on the input. To define a new temporal concept, NL module 232 needs to know the time and have some way of determining the most prototypical time 402 exemplifying that concept, as well as a lower boundary 404 and an upper boundary 406 defining when that concept clearly holds. The range of boundaries 404 and 406 of the temporal concept is used to determine the rate of the fall-off. The midpoint of the boundary is interpreted by NL module 232 as the most prototypical time. In the exemplary implementation, the fall-off is implemented as tails of a Gaussian (normal) distribution function with a standard deviation $\sigma$ equal to ½ the distance from the midpoint to a boundary, where $\mu$ is defined to be the most prototypical time. However, any convenient continuous function can be used, including, for example, a Poisson distribution function. Additionally, each sentence template may use a separate functional form. Universal Coordinated Time (UTC) is used as a canonical way of expressing and comparing times. NL module 232 enables multiple variants for expressing dates and times and converting them to UTC.

There are at least two kinds of sentence templates that NL module 232 supports as textual input for defining new temporal concepts: (1) definition in terms of an expected time; and (2) definition in terms of boundary times. It should be noted that the following examples of sentence templates are for exemplary purposes only. The embodiments described herein are not restricted to using sentence templates and are not restricted to using the English language. Further, the time-periods described herein are not limited to time-periods of a given granularity. Time-periods may also include other kinds of time-periods, for example lunar cycles and/or tidal calendars.

In defining a new temporal concept in terms of an expected time, a time-concept is defined in terms of an expected time-period of a given granularity (i.e., year, month, day, hour, minute, or second or the like). A first sentence template for defining a temporal concept is given by:

$$S=\text{[the time] time-concept occurs [every/this] time-period1 [at/on] [the time-period2] of time.}$$

Examples of the first sentence template include:
 EXAMPLE (1a) lunch occurs every day at the hour of 12 o'clock;
 EXAMPLE (1b) midnight occurs every day at 24:00;
 EXAMPLE (1c) Christmas occurs every year on the day of December 25; and (1d) the fire drill occurs this day at the time of 11:15 AM.

When a temporal concept is defined according to the first sentence template, the name of the concept is being associated with its ideal, or most prototypical value 402. If the time is a recurrent time period, then it repeats according to the first time period, time-period1 (e.g., "every year"). The second time period, time-period2, indicates the size of the time interval (i.e., an amount of time between boundaries 404 and 406) and is also used to determine how near a time point is when it falls outside of interval (404 and 406). Time-period2 may default to one minute or other pre-determined time-period if unspecified. The size of interval (404 and 406) surrounding ideal time 402 is plus or minus one-half the size of time-period2. In example (1a), "hour" is specified, so lunch is defined as having a membership 1.0 from 11:30 AM to 12:30 PM and then falling off, with σ=30 minutes for values outside of that range. In example 1(b), midnight is defined by one minute and, accordingly, has σ=30 seconds. In example (1c), σ=one day, and in (1d), the interval is one minute with σ=30 seconds.

As shown in FIG. 4, NL module 232 takes a hard binary predicate by using a temporal interval having sharp cut-offs at lower boundary 404 and upper boundary 406. A culturally-defined time such as "lunch" is modeled with a prototypical time 402 and time intervals (404 and 406) surrounding it.

Figure 5:
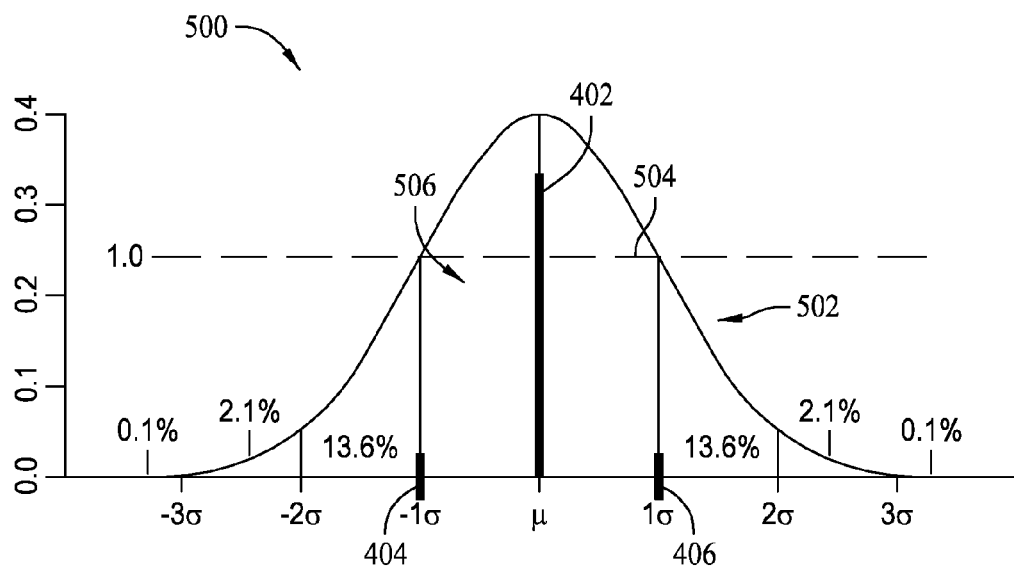
FIG. 5 is a plot illustrating a smoothed membership function according to the first temporal sentence template during generation of a basis function based on a temporal concept by the NL module shown in FIG. 2.

FIG. 5 is a plot illustrating a smoothed membership function 502 according to the first temporal sentence template described in FIG. 4 during generation of a basis function based on a temporal concept defined by the NL module shown in FIG. 2. As shown in FIG. 5, the binary predicate having rigid boundaries 404 and 406 (shown in FIG. 4) is softened by overlaying a bell curve 504, or other soft fall-off function, on the predicate. NL module 232 then removes the top of the bell curve by limiting membership of the function to and area 506, which is the area under bell curve 504 and between lower and upper boundaries 404 and 406. By restricting the membership to within area 506, NL module 232 substantially clamps the value to 1.0 between μ−σ and μ+σ. Normal bell curve 504 fall-off occurs outside of the range between μ−σ and μ+σ, enabling the predicate to be "softened." The membership function "softens" the binary predicate to provide values from 0.0 to 1.0 falling off as the value goes outside the bounds of the temporal concept.

Figure 6:
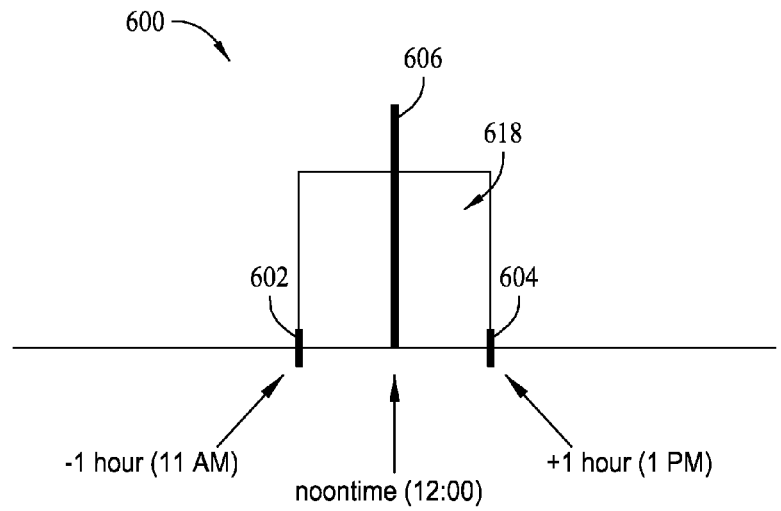
FIG. 6 is a plot illustrating a binary predicate created according to a second temporal sentence template during generation of a basis function based on the temporal concept of lunchtime in the United States defined by the NL module shown in FIG. 2.

FIG. 6 is a plot illustrating a binary predicate created according to a second temporal sentence template during generation of a basis function based on the temporal concept of lunchtime in the United States defined by the NL module shown in FIG. 2.

If it is desired that the time interval be different than one-half the granularity of a month, day, hour, minute, or second, as shown in FIGS. 4 and 5, then a second temporal sentence template is used. The second sentence template defines a new temporal concept in terms of boundary times, or more specifically, a start time 602 and a stop time 604. Start and end times 602 and 604 may be any UTC times. The second sentence template defines a temporal concept S, and is given by:

$$S=\text{[the time] time-concept [starts/is from] start-time [and ends/to/until] end-time.}$$

Examples of the second sentence template include:
 EXAMPLE (2a) Ramadan starts 20 Jul. 2012 and ends 18 Aug. 2012;
 EXAMPLE (2b) lunch is from 11:00 to 13:00; and
 EXAMPLE (2c) vacation holiday is from Christmas until New Year's.

When a temporal concept is defined according to the second sentence template, the name of the concept is being associated with an interval (i.e., between start and stops times 602 and 604), where the start/stop dates and/or times are given. The midpoint of the interval is taken as the ideal or most prototypical value 606. The size of interval (602 and 604) is given directly by start and end times 602 and 604.

In example (2a), Ramadan is defined as having an interval of 30 days (from 2012 Jul. 20 to 2012 Aug. 18 inclusive of both days), so σ=15 days and the midpoint μ is Aug. 3, 2012. Similarly, in example (2b), lunch is defined as having an interval of 2 hours, rather than the default 1 hour in example (1a). In both cases, the temporal concepts are represented as partially specified UTC times, where a lower limit, upper limit, and prototypical value are provided. The unspecified parts of the UTC times are filled in from a particular query time, where any query time is fully instantiated with years, months, days, hours, minutes, and seconds. The query times are taken from track data that associate agent movements, or key domain events, at particular times with geographic coordinates.

As shown in FIG. 6, if "lunch" is defined as occurring between 11:00 AM and 1:00 PM, upper and lower limits 602 and 604 are provided. FIG. 6 shows an initial binary predicate 608 bound by limits 602 and 604. Upper limit 604 is 1:00 PM and lower limit 602 is 11:00 AM. In the example of FIG. 6, a Gaussian function is used, but other fall-off functions could be predicated. A wider variance is specified with some prepositions, e.g., "around", and a tighter variance is specified with others, e.g., "inside". Negation is defined as 1−x, where x would be the membership function without negation. For example, if "suspicious traffic occurs outside Kirkuk at night near roads with stops" is specified, then the portion of the membership function that would be derived from "outside" is the same as the value as "not inside", or 1-that value. The overall membership function is a combination of the spatial ("outside Kirkuk near roads"), temporal (at night), and behavioral ("with stops"). In this manner, multiple inputs may be combined using fuzzy logic to aggregate multiple membership functions into an overall membership function for an aggregate concept where the membership function provides values from 0.0 to 1.0 falling off as the value goes outside the bounds of the aggregate concept. In various embodiments, a spatiotemporal function f(s,t) may be defined for space and time which returns a value of approximately 1.0 when s describes spatial proximity to the spatial concept and t describes a temporal proximity to the temporal concept, and declines toward 0.0 as the space and time supplied deviate from the spatial and temporal concepts.

Figure 7:
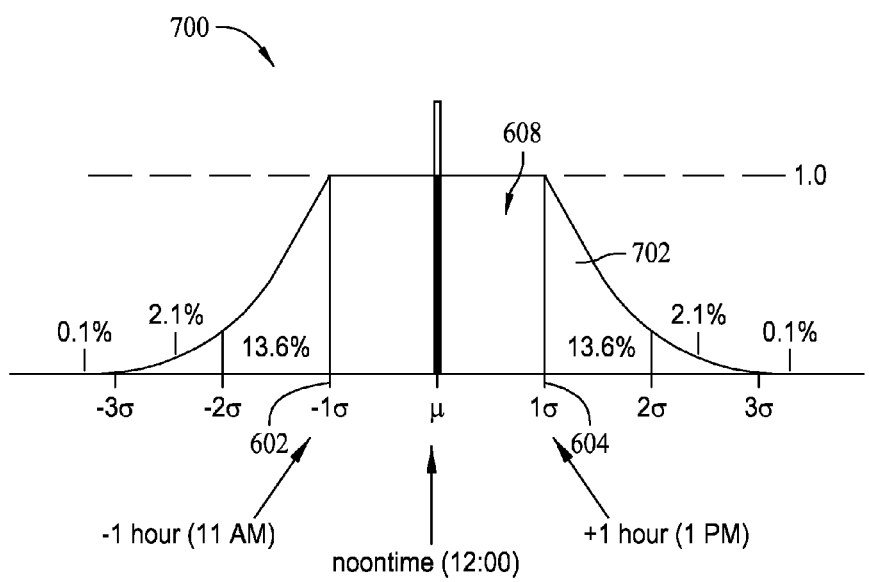
FIG. 7 is a plot illustrating a smoothed membership function according to the second temporal sentence template during generation of a basis function based on a temporal concept by the NL module shown in FIG. 2.

FIG. 7 is a plot 700 illustrating a smoothed membership function according to the second temporal sentence template during generation of a basis function based on a temporal concept defined by the NL module shown in FIG. 2. Smoothing binary predicate 608 with a bell curve 702 provides a smoothed membership function, as shown in FIG. 7. For proximity reasoning, the smoothed membership function is used, while for relational reasoning (e.g., "Did Jack visit after lunch?"), the predicate definition is used.

To determine the membership u of a time point, for example 11:30 AM, the value is 1.0 for $\mu-\sigma \leq x \leq \mu+\sigma$, and otherwise the membership u is given by evaluating the Gaussian density with the parameters $\mu$ and $\sigma$ specified by the basis function, scaled by $$\sigma\sqrt{2\pi e},$$

so as to make the value at 1 standard deviation exactly 1 and then it falls off toward zero from there. The entire basis function is thus given by $$\sqrt{e}\exp\left(-\frac{1}{2\sigma^2}(x-\mu)^2\right),$$

for $|x-\mu| \geq \sigma$. For example, for 1:30 pm, x is $\mu+1.5\sigma$, so $=e^{-0.625}$, or 0.535261. The equation multiplies the normal curve equation by a constant, so that the value at $\mu+\sigma$ is 1.0, and at $\mu-2\sigma$, it is $e^{-1.5}$, etc. Thus, 2 pm has membership 0.223130.

The definition of "lunch" from example 2(b), where lunch is defined as happening between 11:00 and 13:00, provides a binary predicate lunch(t) that is true when $11:00 \leq t \leq 13:00$, as shown in FIG. 6. The membership function for "lunch" when $\sigma=1$ and $\mu=12:00$ is shown in FIG. 7. There is a rapid, but smooth fall-off in bell curve 702 for values of time outside of 11:00 and 13:00.

Figure 8:
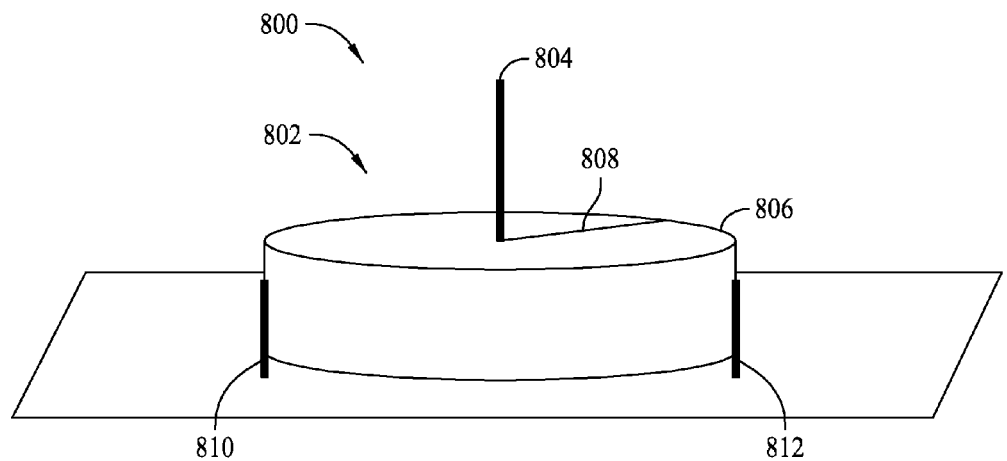
FIG. 8 is a plot illustrating a binary predicate created according to a spatial sentence template during generation of a basis function based on a spatial concept by the NL module shown in FIG. 2.
Figure 9:
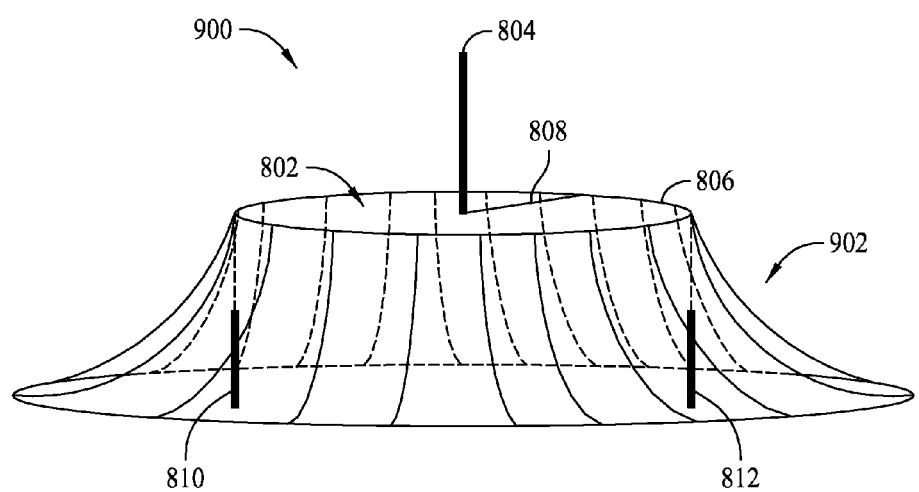
FIG. 9 is a plot illustrating a smoothed membership function according to the spatial sentence template during generation of a basis function based on a spatial concept by the NL module shown in FIG. 2.

FIG. 8 is a plot 800 illustrating a binary predicate created according to a spatial sentence template during generation of a basis function based on a spatial concept defined by the NL module shown in FIG. 2. FIG. 9 illustrates a smoothed membership function according to the spatial sentence template during generation of a basis function based on a spatial concept by the NL module shown in FIG. 2.

Spatial concepts are defined similarly as to temporal concepts. First, a binary predicate 802 is constructed that is suitable for defining whether a point is within a spatial region, and second, the predicate is "softened". Spatial concepts are defined with proper names (e.g., "The Green Zone" or "Baghdad") and are pegged to a map where it is decided whether a track point comes "near" them or not.

To simplify the comparisons and proximity reasoning, places (spatial regions) are modeled as having a central point 804 with a circle 806 around it. Central point 804 is the most prototypical point 804 or object, for example, it could be 'downtown' for a city, or a town square off the high street for a village. Places that are modeled include, but are not limited to, cities, proximity to urban-scale structures such as mosques, factories, buildings, gas stations or the like. Additionally, a more precise definition of a spatial concept may be obtained from geographic data sources, such as geographic information systems (GIS). In some implementations, more sophisticated spatial reasoning, supporting polygons for regions, and determining if one region, or its rectangular bounding box, overlapped another is provided.

A radius 808 of circle 806 modeling a spatial region models a size of the physical location, encompassing the bulk of its area, and intuitively how "close" or "near" (i.e., a spatial descriptor) a track point may be to the place. For example, a car may be "close" to a major bridge if it is 1 km from it, but not "close" to a café until it is within the same block. Accordingly, the spatial descriptor is relative to the size of the object being discussed. Categories of places (e.g., churches) may have a default radius 808 that may be overridden for exceptionally large or small instances.

Each track point has a location, expressed as a latitude and longitude, along with a timestamp. Map coordinates are also used as the basis for the definitions of spatial regions. In defining a new spatial concept in terms of central point 804, a spatial concept is defined in terms of some point in space that is most prototypical of that place. For example, the point in space might be a town square in a village, or a salient point, such as the White House in Washington D.C., or simply the rough center of a city. One example of a spatial sentence template for defining a spatial concept S is given by:

S=[the place] place-concept is a kind-of-place [with radius r] at coordinates (x,y).

The kind-of-place is either a "place" or a predefined computer processible word with some sense that inherits from the single computer processible sense of "geographic area", such as "public square", or the first sense of "building", such as "church". The kind-of-place may be categorized such that it enables estimation of a default size for a particular place of that kind (e.g., a typical village church), so the radius can be omitted if a place instance is of a 'typical' size. The "typical" sizes are part of the background knowledge database specified in NL and stored in the NL module's memory.

As shown in FIG. 8, the first-step binary predicate 802 representation of a spatial region is similar to FIG. 4, extrapolated into two dimensions and still having sharp cut-offs at outer limits 810 and 812. A culturally defined place, such as a mosque, is modeled with prototypical center 804 and radius 808 surrounding prototypical center 804 such that the main mass of the spatial region is encompassed.

Examples of the spatial sentence template include:

EXAMPLE (3a) Seattle is a city at 47°36'35"N 122°19'59"W;

EXAMPLE (3b) Stow-on-the-Wold is a village at 51.928°N 1.718°W;

EXAMPLE (3c) Alamo Square is a park at 37.776384°N 122.434709°W with radius 0.6 km; and EXAMPLE (3d) The Space Needle is a tower at 47.6204, −122.3491.

When a place name is defined according to the spatial sentence template, the place name is associated with the single most salient map location considered by the user to best characterize it. The particular place that is considered the most salient example of a location, and the boundaries of a place, will often be culturally defined. For example, the "Professorville" location of Palo Alto may be considered to be bounded by "The historic district is bounded by Kingsley and Addison avenues and the cross streets of Ramona and Waverly", but other individuals may consider the Professorville to be larger and bounded by "Addison and Cowper St. to the north west and north east and Emerson St. and Embarcadero Rd. to the south west and south east."

A default radius 808 is defined for a kind of geographic region or building by relating the area of the spatial region to its radius. The radius sentence template is given by: "A kind-of-place has a default area of area1." Examples of the radius sentence template include:

EXAMPLE (4a) A house has a default area of 2000 square feet;

EXAMPLE (4b) A city has a default area of 150 square miles; and

EXAMPLE (4c) A village has a default area of 2.5 square miles.

Radius 808 is implicitly defined from the area of circle 806, assuming the area is circular.

FIG. 9 is a plot 900 illustrating a smoothed membership function according to the spatial sentence template during generation of a basis function based on a spatial concept defined by the NL module shown in FIG. 2. As shown in FIG. 9, binary predicate 802 is "softened" for spatial locations to have a fall-off area 902, similar to the handling of temporal concepts described in FIGS. 4-7. Rather than having a predicate such as mosque(p) that returns a True or False value as known systems do, the exemplary implementation includes a membership function that returns 0.0 (far from the mosque) to 1.0 (inside the mosque, at its center), with a fall-off (e.g., 0.8 could be outside the mosque but close to it).

In intelligence and security applications, most of the regions of interest are particular kinds of buildings or locations, such as checkpoints, mosques, and/or markets that can be sufficiently approximated with circular regions when looked at from a city-map. For applications other than traffic anomaly detection applications, where irregular city and structure shapes need to be modeled, more sophisticated modeling techniques may be used.

In one implementation, a lexical database, or ontology, is used such that new kinds or instances of temporal and/or spatial concepts can be recognized as belonging to previous categories. This enables default parameters to be supplied by inheritance. For example, default properties may be defined for a specified class of objects. If the default area of a marketplace is defined to X square feet, then a "town marketplace" would default to the same size, and the "Kirkuk town marketplace", being defined as an instance of "town marketplace", would similarly inherit the same default size. Any new instance or type could overrule the inherited value.

In another implementation, parsing may be refined to take into account user-defined temporal or spatial terms to better choose the most appropriate parses. For example, by preferring attachment of temporal prepositions to events and spatial prepositions to preceding nouns, the sentence "The insurgents struck the dome in Kirkuk in the morning" would consider "in Kirkuk" to apply to "the dome", and "in the morning" would apply to the strike event. Such an implementation assumes that the user had previously defined the spatial concept "Kirkuk" and the temporal concept "morning".

The methods and systems described herein may be implemented using computer programming or engineering techniques including computer software, firmware, hardware or any combination or subset thereof, wherein an exemplary technical effect may include at least one of: (a) receiving, at a processor, an input including text representing one or more observed parameters of an environment, the inputted text being in a natural language format; (b) using the processor to parse the input and extract the one or more parameters; and (c) defining a function representing a domain of the one or more observed parameters based upon the one or more extracted parameters.

As compared to known methods and systems for interpreting natural language, the methods and systems described herein enable generation of a basis function that represents vague spatial and/or temporal concepts using a mathematical expression that is understandable by a computer device. The methods and systems described herein also enable vaguely defined spatial and temporal concepts (e.g., "lunch", "town square") to be defined in ways that are culturally and situationally appropriate, as spatial and temporal concepts may vary among different cultures. The use of spatial and temporal sentence templates enables an analyst to provide background knowledge specific to a culture and a situation, and to rapidly experiment with different domain features to best model a domain. Moreover, the sentence templates enable non-programmer subject-matter experts to use the system by inputting natural language, eliminating the need for programmers, code integration, and SME-programmer interactions.

Implementations of the systems and methods described herein may embrace one or more computer-readable media, wherein each medium may be configured to include or includes thereon data or computer-executable instructions for manipulating data. The computer-executable instructions include data structures, objects, programs, routines, or other program modules that may be accessed by a processing system, such as one associated with a general-purpose computer capable of performing various different functions or one associated with a special-purpose computer capable of performing a limited number of functions. Computer-executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer-readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

The methods described herein may be encoded as executable instructions embodied in a computer readable medium, including, without limitation, a storage device or a memory area of a computing device. Such instructions, when executed by one or more processors, cause the processor(s) to perform at least a portion of the methods described herein. As used herein, a "storage device" is a tangible article, such as a hard drive, a solid state memory device, and/or an optical disk that is operable to store data, such as computer-executable instructions.

The description of the different advantageous implementations has been presented for purposes of illustration and description, and is not intended to be exhaustive or limited to the implementations in the form disclosed. Many modifications and variations will be apparent to those of ordinary skill in the art. Further, different advantageous implementations may provide different advantages as compared to other advantageous implementations. The implementation or implementations selected are chosen and described in order to best explain the principles of the implementations, the practical application, and to enable others of ordinary skill in the art to understand the disclosure for various implementations with various modifications as are suited to the particular use contemplated.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method of processing natural language for machine learning analytical systems, the method comprising:
   receiving, by a processor, tracked observed parameters of agent behavior input by a tracking system including at least one of a satellite and a radar system;
   receiving, by a natural language (NL) module, an input including text representing one or more observed parameters of an environment, the inputted text being in a natural language format;
   using the NL module to parse the input in the natural language format and extract at least one of a spatial concept and a temporal concept from the inputted text;
   defining, by the NL module, a mathematical function f(s,t) of space and time representing a domain of the one or more observed parameters based upon the at least one of the spatial concept and the temporal concept, wherein the mathematical function f(s,t) returns a value of approximately 1.0 when s describes spatial proximity to the spatial concept and t describes a temporal proximity to the temporal concept, and declines toward 0.0 as the space and time supplied deviate from the spatial and temporal concepts;
   storing the defined mathematical function f(s,t) as a domain descriptor in a database communicatively coupled to the NL module;
   calculating, by the processor, a likelihood that the tracked observed parameters from the tracking system correlate to the at least one of the spatial concept and the temporal concept based on the mathematical function f(s,t); and
   displaying, by the processor, an alert on a display based on the calculated likelihood.

2. A method in accordance with claim 1, wherein extracting at least one of a spatial concept and a temporal concept comprises extracting a spatiotemporal relationship.

3. A method in accordance with claim 2, further comprising:
   receiving a plurality of inputs and extracting one or more parameters from each of the inputs; and
   redefining the function based upon the extracted parameters of the plurality of inputs.

4. A method in accordance with claim 1, wherein extracting at least one of a spatial concept and a temporal concept comprises extracting language elements that describe a plurality of predicates corresponding to sensing capabilities of the tracking system.

5. A method in accordance with claim 4, further comprising overlaying one of a bell curve and a Gaussian function on the plurality of predicates to generate a smoothed membership function.

6. A method in accordance with claim 1, further comprising defining the temporal concept in terms of one of a sentence template and a defined grammar, wherein the temporal concept is within a controlled natural language.

7. A method in accordance with claim 1, further comprising combining multiple inputs to aggregate multiple membership functions into an overall membership function for an aggregate concept.

8. A method in accordance with claim 1, further comprising defining the spatial concept as having a prototypical point within a bounded region.

9. A method in accordance with claim 8, wherein the spatial concept is further defined as one of a geographical region and a building, said method further comprising deriving a property of a spatial region from a plurality of properties of the spatial region.

10. A method in accordance with claim 9, further comprising deriving one of a radius and an area of the spatial region.

11. A method in accordance with claim 9, further comprising defining a default property for a specified class of objects.

12. One or more non-transitory computer-readable storage media having computer-executable instructions embodied thereon, wherein when executed by at least one processor, the computer-executable instructions cause the at least one processor to:
   receive tracked observed parameters of agent behavior input by a tracking system including at least one of a satellite and a radar system;
   receive, by a natural language (NL) module, an input including text representing one or more observed parameters of an environment, the inputted text being in natural language format;
   parse the input in the natural language format and extract at least one of a spatial concept and a temporal concept from the inputted text;
   define, by the NL module, a mathematical function f(s,t) of space and time representing a domain of the one or more observed parameters based upon the at least one of the spatial concept and the temporal concept, wherein the mathematical function f(s,t) returns a value of approximately 1.0 when s describes spatial proximity to the spatial concept and t describes a temporal proximity to the temporal concept, and declines toward 0.0 as the space and time supplied deviate from the spatial and temporal concepts;
   store the defined mathematical function f(s,t) as a domain descriptor in a database communicatively coupled to the NL module;
   calculate, by the processor, a likelihood that the tracked observed parameters received from the tracking system correlate to the at least one of the spatial concept and the temporal concept based on the mathematical function f(s,t); and
   display an alert on a display based on the calculated likelihood.

13. One or more non-transitory computer-readable storage media in accordance with claim 12, wherein to extract at least one of a spatial concept and a temporal concept, the computer-executable instructions are configured to cause the at least one processor to extract language elements that describe a plurality of predicates corresponding to sensing capabilities of the tracking system.

14. One or more non-transitory computer-readable storage media in accordance with claim 13, wherein the computer-executable instructions are configured to cause the at least one processor to overlay one of a bell curve and a Gaussian function on the plurality of predicates to generate a smoothed membership function.

15. A computer-implemented method of determining an anomalous behavior comprising:
   utilizing, by a processor, output of a tracking system to track observations of agent behaviors, the tracking system including at least one of a satellite and a radar system;

inputting, to a natural language (NIL) module, an input including text representing one or more observed parameters of an environment, the inputted text being in natural language format;

using the NL module to parse the input in the natural language format and extract at least one of a spatial concept and a temporal concept from the inputted text using the processor;

defining, by the NL module, a mathematical function f(s,t) of space and time representing a domain of the one or more observed parameters based upon the at least one of the spatial concept and the temporal concept, wherein the mathematical function f(s,t) returns a value of approximately 1.0 when s describes spatial proximity to the spatial concept and t describes a temporal proximity to the temporal concept, and declines toward 0.0 as the space and time supplied deviate from the spatial and temporal concepts;

storing the defined mathematical function f(s,t) as a domain descriptor in a database communicatively coupled to the NL module;

calculating, by the processor, a likelihood that the tracked observed parameters received from the tracking system correlate to the at least one of the spatial concept and the temporal concept based on the mathematical function f(s,t);

determining anomalous behavior based on observations of agents and the calculated likelihood; and displaying, by the processor, an alert on a display based on the calculated likelihood.

\* \* \* \* \*